Figure 1:
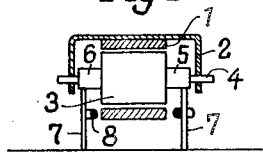

June 7, 1932.   E. WESNIGK   1,862,248

ELECTROMOTOR DRIVE

Filed Feb. 10, 1930

Inventor:
Erwin Wesnigk.

UNITED STATES PATENT OFFICE

ERWIN WESNIGK, OF BERLIN, GERMANY

ELECTROMOTOR DRIVE

Application filed February 10, 1930, Serial No. 427,351, and in Germany February 18, 1929.

In electromotors, and especially in small motors as used for toys, the brushes sliding on collectors are power consuming and easily broken parts.

The invention consists in using the collector as a rotary frictional driving element by applying to it current conductors adapted to roll on it and to transmit the force of the motor onto the force consumer. This may either be done by applying to the collector friction wheels instead of brushes, or in vehicles the collector may roll on a current conducting rail or running plane and serve as a vehicle wheel. In any case the rolling friction becomes useful, and therefore a strong construction of the applying means and much heavier applying pressure than otherwise can be used without damage. Thus a very simple and durable drive is obtainable especially for toys.

A valuable constructional form consists in a motor having two collectors displaced from each other by an angle corresponding to a brush distance, and current conductors applied to both collectors respectively from one side only. In this case both current conductors can serve as common driving means, being for example rollers on a common shaft or a pair of running rails in a railway.

In the use for vehicles it is further valuable to arrange the motor or the whole vehicle shiftable in the vertical direction with respect to the current conducting means, so that the applying pressure between both is produced by gravity.

Further details of the invention will appear below.

Several embodiments of the invention are illustrated in the drawing, in which

Figure 2:
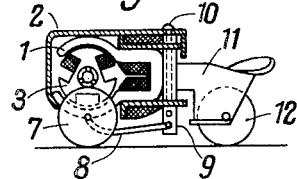
Figure 3:
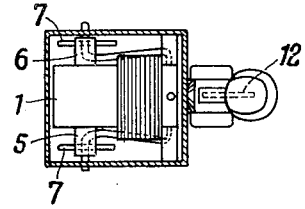
Figure 4:
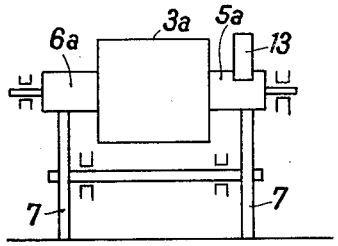
Figure 5:
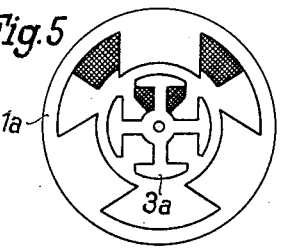
Figure 6:
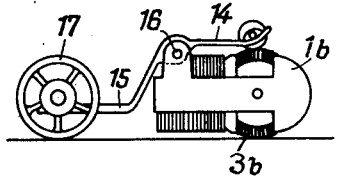
Figure 7:
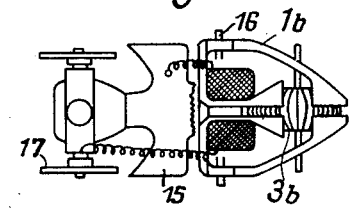
Figure 8:
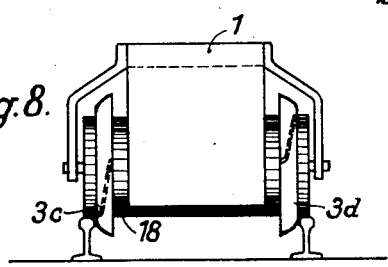

Figs. 1, 2 and 3 are a cross section, a lateral view, partly in section, and a top view, partly in section, of a three wheeled car, Figs. 4 and 5 are a front view and a lateral view of the essential parts of a vehicle with a motor having three stator poles, Figs. 6 and 7 are a lateral view and a top view, partly in section, of a three wheeled car having an electromotor rotor serving at once as rear wheel and as collector, Fig. 8 a front view of a rail vehicle having two collectors serving as running wheels.

In Figs. 1 to 3, a usual two poled stator 1 is enclosed in a casing 2, in which a usual three poled rotor 3 is mounted on a rotating shaft 4. On said shaft, two collectors 5, 6 are arranged, the corresponding laminæ of which are placed at an angle of 180 degrees to each other and each lamina of one collector is electrically connected to the diametrically opposed lamina of the other collector and to one wire end of the usual rotor winding, which may be switched in star or in triangle as usual. Two running wheels 7 of the vehicle are mounted on levers 8 in an insulating piece 9 in such way, that the motor by its weight applies the collectors 5, 6 to the running wheels 7, which in their turn run on the current conducting running plan. Said running plan may consist of rails or of a plan having a current conducting surface of separate metallic portions alternately connected to the two poles of a current source (as for example described in German Patent 367,826). The exciting winding of the stator 1 is connected to said levers 8. Thus, the running wheels act at once as collector brushes and as trolleys, and they transmit the motor power in the manner of a reduction gear to the running plan for driving the vehicle.

The vehicle has a rear part 11 adjoined to the front part by a vertical pivot 10 and containing a rear wheel 12, so that due to the only three supporting points the current conducting capacity of the front wheels 7 is always ensured.

A similar vehicle can be produced, if only one collector 5 is provided and 6 is only a friction roller, and to the collector 5, a usual brush is applied oppositely to the contacting point of the wheel 7. Said brush is then electrically connected to the lever 8 of the other wheel 7, for being fed with current, or it is used for switching the rotor and stator windings in series.

In Figs. 4 and 5, in a generally similar arrangement a three poled stator 1a is used, in which from three trolleys the current circuits extend through the three stator windings and further to brushes applied to collectors 5a and 6a of a four poled rotor 3a. Corresponding to the poles of the stator the brush distances need to be 120 degrees each. Therefore the collectors are displaced from each other by 120 degrees and rest again on running wheels 7, which serve as two trolleys and brushes. For the third stator pole circuit a usual brush 13 is applied to any of said collectors at a point distanced 120 degrees from the contacting point of the respective wheel 7, so that in the whole three collector points with equal distance are fed with current. The brush 13 is fed with current through the appertaining stator winding from a third car wheel or from a usual trolley.

In this motor three current circuits are available, each of which is adpted to drive the motor, so that also when using the above mentioned conducting surfaces with interrupted metallic portions a good drive is attained, as in the most running positions any two of the three trolleys touch differently polarized conducting surfaces. Nevertheless also this drive is realized with only one brush in addition to the running wheels.

In Figs. 6 and 7, in a two poled stator 1b an annular rotor 3b of lens-like shape is mounted. The winding of said rotor is deprived of insulation on the greatest periphery, so that said rotor at once serves as collector, driving wheel and trolley roller. An additional collector brush 14 provided with a roller is applied to the highest point of said rotor, and said brush is held on a vehicle frame 15 which is linked to the motor 1b, by a transverse pivot 16 and supported on the front end by a dirigible front wheel axle 17. Thus the vehicle tends to sink down by its own weight on its middle portion and thereby applies the brush 14 to the rotor 3b without the aid of applying springs.

The winding of the stator 1b is connected on one end to one front wheel serving as a trolley, and on the other end to the frame 15 and thereby to the brush 14.

In Fig. 8, in a permanent stator magnet 1 a rotor 18 (shown as a continuously wound tube-like annular rotor) is provided with two collectors serving as flanged running wheels for running on current conducting rails. Here, the rotor windings 3c, 3d are immediately used as collector laminæ by being deprived of insulation on the portions serving as running surfaces. Said portions are displaced with respect to the main portions, enclosed between the stator poles, at angles of 90 degrees the intermediate wire parts being wound along screw lines round the rotor body and held by the afterwards mounted wheel flanges. The collectors are thus displaced from each other by 180 degrees and serve at once as running wheels and trolleys.

Also in this constructional form the rotor may be manufactured as a usual three poled rotor with two collectors having each three laminæ as for example shown in Fig. 1, with the exception that the collectors advantageously are essentially enlarged for supporting the vehicle at a sufficient height.

In the case of using alternating current the stator 1 also in this example is manufactured as an electromagnet, the winding of which is fed with current by two further trolleys or running wheels of the vehicle.

I claim:

1. An electromotor vehicle, comprising in combination a vehicle frame, an electromotor rotor, a current conducting friction drive including a collector operatively connected to said rotor for driving the vehicle, and an electromotor stator, the lowest portions of said frame, rotor and stator being arranged above the lowest point of said friction drive.

2. An electromotor vehicle as claimed in claim 1, wherein the rotor has two collectors displaced against each other by an angle corresponding to a current brush distance, and extending below the lowest point of all remaining vehicle members for serving as vehicle running wheels.

3. An electromotor vehicle as claimed in claim 1, wherein the rotor has two collectors displaced against each other by an angle corresponding to a current brush distance, and extending below the lowest point of all remaining vehicle members for serving as vehicle running wheels, and said rotor and collectors are supported on the vehicle frame in bearings on the outer sides of said collectors.

4. An electromotor vehicle as claimed in claim 1, wherein the rotor circumference is constructed as a collector serving as a vehicle running wheel, and a current conducting member is applied to said collector on a point distant from its lowest point.

5. An electromotor vehicle as claimed in claim 1, wherein the rotor circumference is constructed as a collector serving as a vehicle running wheel, a current conducting roller is applied to said collector on a point distant from its lowest point, and the vehicle frame is made of two parts connected by a horizontal link, one of said parts containing the motor, and the other part being fitted with running wheels and holding said current conducting roller so as to apply it to the collector by the weight of a portion of the vehicle.

6. An electromotor vehicle as claimed in claim 1, wherein the rotor has two collectors displaced against each other by an angle corresponding to a current brush distance, and the friction drive includes current conducting vehicle running wheels applied from below to said collectors.

7. An electromotor vehicle as claimed in claim 1, wherein the rotor has two collectors displaced against each other by an angle corresponding to a current brush distance, and the friction drive includes current conducting vehicle running wheels held on the frame and stator yieldable in essentially vertical directions, so as to be applied from below to said collectors by a portion of the vehicle weight.

In witness whereof I affix my signature.

ERWIN WESNIGK.